US010877694B2

(12) United States Patent
La Fratta et al.

(10) Patent No.: US 10,877,694 B2
(45) Date of Patent: *Dec. 29, 2020

(54) COMMAND SELECTION POLICY WITH READ PRIORITY

(71) Applicant: Micron Technology, Inc., Boise, ID (US)

(72) Inventors: Patrick A. La Fratta, McKinney, TX (US); Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 212 days.

This patent is subject to a terminal disclaimer.

(21) Appl. No.: 16/117,356

(22) Filed: Aug. 30, 2018

(65) Prior Publication Data

US 2019/0317697 A1 Oct. 17, 2019

Related U.S. Application Data

(63) Continuation of application No. 15/951,896, filed on Apr. 12, 2018, now Pat. No. 10,725,696.

(51) Int. Cl.
*G06F 3/06* (2006.01)
(52) U.S. Cl.
CPC .......... *G06F 3/0659* (2013.01); *G06F 3/0604* (2013.01); *G06F 3/0679* (2013.01)
(58) Field of Classification Search
CPC ..... G06F 3/0659; G06F 3/0604; G06F 3/0679
See application file for complete search history.

(56) References Cited

U.S. PATENT DOCUMENTS

| 4,380,046 A | 4/1983 | Fung |
| 4,435,792 A | 3/1984 | Bechtolsheim |

(Continued)

FOREIGN PATENT DOCUMENTS

| CN | 102141905 | 8/2011 |
| EP | 0214718 | 3/1987 |

(Continued)

OTHER PUBLICATIONS

Dybdahl, et al., "Destructive-Read in Embedded DRAM, Impact on Power Consumption," Apr. 2006, (10 pgs.), vol. 2, Issue 2, Journal of Embedded Computing-Issues in embedded single-chip multicore architectures.

(Continued)

*Primary Examiner* — Eric Cardwell
(74) *Attorney, Agent, or Firm* — Brooks, Cameron & Huebsch, PLLC

(57) ABSTRACT

Apparatuses and methods related to command selection policy for electronic memory or storage are described. Commands to a memory controller may be prioritized based on a type of command, a timing of when one command was received relative to another command, a timing of when one command is ready to be issued to a memory device, or some combination of such factors. For instance, a memory controller may employ a first-ready, first-come, first-served (FRFCFS) policy in which certain types of commands (e.g., read commands) are prioritized over other types of commands (e.g., write commands). The policy may employ exceptions to such an FRFCFS policy based on dependencies or relationships among or between commands. An example can include inserting a command into a priority queue based on a category corresponding to respective commands, and iterating through a plurality of priority queues in order of priority to select a command to issue.

21 Claims, 7 Drawing Sheets

(56) References Cited

U.S. PATENT DOCUMENTS

| | | |
|---|---|---|
| 4,435,793 A | 3/1984 | Ochii |
| 4,727,474 A | 2/1988 | Batcher |
| 4,843,264 A | 6/1989 | Galbraith |
| 4,958,378 A | 9/1990 | Bell |
| 4,977,542 A | 12/1990 | Matsuda et al. |
| 5,023,838 A | 6/1991 | Herbert |
| 5,034,636 A | 7/1991 | Reis et al. |
| 5,201,039 A | 4/1993 | Sakamura |
| 5,210,850 A | 5/1993 | Kelly et al. |
| 5,253,308 A | 10/1993 | Johnson |
| 5,276,643 A | 1/1994 | Hoffmann et al. |
| 5,325,519 A | 6/1994 | Long et al. |
| 5,367,488 A | 11/1994 | An |
| 5,379,257 A | 1/1995 | Matsumura et al. |
| 5,386,379 A | 1/1995 | Ali-Yahia et al. |
| 5,398,213 A | 3/1995 | Yeon et al. |
| 5,440,482 A | 8/1995 | Davis |
| 5,446,690 A | 8/1995 | Tanaka et al. |
| 5,473,576 A | 12/1995 | Matsui |
| 5,481,500 A | 1/1996 | Reohr et al. |
| 5,485,373 A | 1/1996 | Davis et al. |
| 5,506,811 A | 4/1996 | McLaury |
| 5,615,404 A | 3/1997 | Knoll et al. |
| 5,638,128 A | 6/1997 | Hoogenboom |
| 5,638,317 A | 6/1997 | Tran |
| 5,654,936 A | 8/1997 | Cho |
| 5,678,021 A | 10/1997 | Pawate et al. |
| 5,724,291 A | 3/1998 | Matano |
| 5,724,366 A | 3/1998 | Furutani |
| 5,751,987 A | 5/1998 | Mahant-Shetti et al. |
| 5,787,458 A | 7/1998 | Miwa |
| 5,854,636 A | 12/1998 | Watanabe et al. |
| 5,867,429 A | 2/1999 | Chen et al. |
| 5,870,504 A | 2/1999 | Nemoto et al. |
| 5,915,084 A | 6/1999 | Wendell |
| 5,935,263 A | 8/1999 | Keeth et al. |
| 5,986,942 A | 11/1999 | Sugibayashi |
| 5,991,209 A | 11/1999 | Chow |
| 5,991,785 A | 11/1999 | Alidina et al. |
| 6,005,799 A | 12/1999 | Rao |
| 6,009,020 A | 12/1999 | Nagata |
| 6,092,186 A | 7/2000 | Betker et al. |
| 6,122,211 A | 9/2000 | Morgan et al. |
| 6,125,071 A | 9/2000 | Kohno et al. |
| 6,134,164 A | 10/2000 | Lattimore et al. |
| 6,147,514 A | 11/2000 | Shiratake |
| 6,151,244 A | 11/2000 | Fujino et al. |
| 6,157,578 A | 12/2000 | Brady |
| 6,163,862 A | 12/2000 | Adams et al. |
| 6,166,942 A | 12/2000 | Vo et al. |
| 6,172,918 B1 | 1/2001 | Hidaka |
| 6,175,514 B1 | 1/2001 | Henderson |
| 6,181,698 B1 | 1/2001 | Hariguchi |
| 6,182,177 B1 | 1/2001 | Harriman |
| 6,208,544 B1 | 3/2001 | Beadle et al. |
| 6,226,215 B1 | 5/2001 | Yoon |
| 6,301,153 B1 | 10/2001 | Takeuchi et al. |
| 6,301,164 B1 | 10/2001 | Manning et al. |
| 6,304,477 B1 | 10/2001 | Naji |
| 6,389,507 B1 | 5/2002 | Sherman |
| 6,418,498 B1 | 7/2002 | Martwick |
| 6,466,499 B1 | 10/2002 | Blodgett |
| 6,510,098 B1 | 1/2003 | Taylor |
| 6,563,754 B1 | 5/2003 | Lien et al. |
| 6,578,058 B1 | 6/2003 | Nygaard |
| 6,731,542 B1 | 5/2004 | Le et al. |
| 6,754,746 B1 | 6/2004 | Leung et al. |
| 6,768,679 B1 | 7/2004 | Le et al. |
| 6,807,614 B2 | 10/2004 | Chung |
| 6,816,422 B2 | 11/2004 | Hamade et al. |
| 6,819,612 B1 | 11/2004 | Achter |
| 6,894,549 B2 | 5/2005 | Eliason |
| 6,943,579 B1 | 9/2005 | Hazanchuk et al. |
| 6,948,056 B1 | 9/2005 | Roth et al. |
| 6,950,771 B1 | 9/2005 | Fan et al. |
| 6,950,898 B2 | 9/2005 | Merritt et al. |
| 6,956,770 B2 | 10/2005 | Khalid et al. |
| 6,961,272 B2 | 11/2005 | Schreck |
| 6,965,648 B1 | 11/2005 | Smith et al. |
| 6,985,394 B2 | 1/2006 | Kim |
| 6,987,693 B2 | 1/2006 | Cernea et al. |
| 7,020,017 B2 | 3/2006 | Chen et al. |
| 7,028,170 B2 | 4/2006 | Saulsbury |
| 7,045,834 B2 | 5/2006 | Tran et al. |
| 7,054,178 B1 | 5/2006 | Shiah et al. |
| 7,061,817 B2 | 6/2006 | Raad et al. |
| 7,079,407 B1 | 7/2006 | Dimitrelis |
| 7,173,857 B2 | 2/2007 | Kato et al. |
| 7,187,585 B2 | 3/2007 | Li et al. |
| 7,196,928 B2 | 3/2007 | Chen |
| 7,260,565 B2 | 8/2007 | Lee et al. |
| 7,260,672 B2 | 8/2007 | Garney |
| 7,372,715 B2 | 5/2008 | Han |
| 7,400,532 B2 | 7/2008 | Aritome |
| 7,406,494 B2 | 7/2008 | Magee |
| 7,447,720 B2 | 11/2008 | Beaumont |
| 7,454,451 B2 | 11/2008 | Beaumont |
| 7,457,181 B2 | 11/2008 | Lee et al. |
| 7,535,769 B2 | 5/2009 | Cernea |
| 7,546,438 B2 | 6/2009 | Chung |
| 7,562,198 B2 | 7/2009 | Noda et al. |
| 7,574,466 B2 | 8/2009 | Beaumont |
| 7,602,647 B2 | 10/2009 | Li et al. |
| 7,663,928 B2 | 2/2010 | Tsai et al. |
| 7,685,365 B2 | 3/2010 | Rajwar et al. |
| 7,692,466 B2 | 4/2010 | Ahmadi |
| 7,752,417 B2 | 7/2010 | Manczak et al. |
| 7,791,962 B2 | 9/2010 | Noda et al. |
| 7,796,453 B2 | 9/2010 | Riho et al. |
| 7,805,587 B1 | 9/2010 | Van Dyke et al. |
| 7,808,854 B2 | 10/2010 | Takase |
| 7,827,372 B2 | 11/2010 | Bink et al. |
| 7,869,273 B2 | 1/2011 | Lee et al. |
| 7,898,864 B2 | 3/2011 | Dong |
| 7,924,628 B2 | 4/2011 | Danon et al. |
| 7,937,535 B2 | 5/2011 | Ozer et al. |
| 7,957,206 B2 | 6/2011 | Bauser |
| 7,979,667 B2 | 7/2011 | Allen et al. |
| 7,996,749 B2 | 8/2011 | Ding et al. |
| 8,042,082 B2 | 10/2011 | Solomon |
| 8,045,391 B2 | 10/2011 | Mohklesi |
| 8,059,438 B2 | 11/2011 | Chang et al. |
| 8,095,825 B2 | 1/2012 | Hirotsu et al. |
| 8,117,462 B2 | 2/2012 | Snapp et al. |
| 8,164,942 B2 | 4/2012 | Gebara et al. |
| 8,208,328 B2 | 6/2012 | Hong |
| 8,213,248 B2 | 7/2012 | Moon et al. |
| 8,223,568 B2 | 7/2012 | Seo |
| 8,238,173 B2 | 8/2012 | Akerib et al. |
| 8,274,841 B2 | 9/2012 | Shimano et al. |
| 8,279,683 B2 | 10/2012 | Klein |
| 8,310,884 B2 | 11/2012 | Iwai et al. |
| 8,332,367 B2 | 12/2012 | Bhattacherjee et al. |
| 8,339,824 B2 | 12/2012 | Cooke |
| 8,339,883 B2 | 12/2012 | Yu et al. |
| 8,347,154 B2 | 1/2013 | Bahali et al. |
| 8,351,292 B2 | 1/2013 | Matano |
| 8,356,144 B2 | 1/2013 | Hessel et al. |
| 8,417,921 B2 | 4/2013 | Gonion et al. |
| 8,462,532 B1 | 6/2013 | Argyres |
| 8,484,276 B2 | 7/2013 | Carlson et al. |
| 8,495,438 B2 | 7/2013 | Roine |
| 8,503,250 B2 | 8/2013 | Demone |
| 8,526,239 B2 | 9/2013 | Kim |
| 8,533,245 B1 | 9/2013 | Cheung |
| 8,555,037 B2 | 10/2013 | Gonion |
| 8,599,613 B2 | 12/2013 | Abiko et al. |
| 8,605,015 B2 | 12/2013 | Guttag et al. |
| 8,625,376 B2 | 1/2014 | Jung et al. |
| 8,644,101 B2 | 2/2014 | Jun et al. |
| 8,650,232 B2 | 2/2014 | Stortz et al. |
| 8,873,272 B2 | 10/2014 | Lee |
| 8,964,496 B2 | 2/2015 | Manning |
| 8,971,124 B1 | 3/2015 | Manning |

(56) References Cited

U.S. PATENT DOCUMENTS

| | | |
|---|---|---|
| 9,015,390 B2 | 4/2015 | Klein |
| 9,047,193 B2 | 6/2015 | Lin et al. |
| 9,165,023 B2 | 10/2015 | Moskovich et al. |
| 9,659,605 B1 | 5/2017 | Zawodny et al. |
| 9,659,610 B1 | 5/2017 | Hush |
| 9,697,876 B1 | 7/2017 | Tiwari et al. |
| 9,761,300 B1 | 9/2017 | Willcock |
| 2001/0007112 A1 | 7/2001 | Porterfield |
| 2001/0008492 A1 | 7/2001 | Higashiho |
| 2001/0010057 A1 | 7/2001 | Yamada |
| 2001/0028584 A1 | 10/2001 | Nakayama et al. |
| 2001/0043089 A1 | 11/2001 | Forbes et al. |
| 2002/0059355 A1 | 5/2002 | Peleg et al. |
| 2003/0167426 A1 | 9/2003 | Slobodnik |
| 2003/0222879 A1 | 12/2003 | Lin et al. |
| 2004/0073592 A1 | 4/2004 | Kim et al. |
| 2004/0073773 A1 | 4/2004 | Demjanenko |
| 2004/0085840 A1 | 5/2004 | Vali et al. |
| 2004/0095826 A1 | 5/2004 | Perner |
| 2004/0154002 A1 | 8/2004 | Ball et al. |
| 2004/0205289 A1 | 10/2004 | Srinivasan |
| 2004/0240251 A1 | 12/2004 | Nozawa et al. |
| 2005/0015557 A1 | 1/2005 | Wang et al. |
| 2005/0078514 A1 | 4/2005 | Scheuerlein et al. |
| 2005/0097417 A1 | 5/2005 | Agrawal et al. |
| 2006/0047937 A1 | 3/2006 | Selvaggi et al. |
| 2006/0059320 A1 | 3/2006 | Akizuki |
| 2006/0069849 A1 | 3/2006 | Rudelic |
| 2006/0112240 A1 | 5/2006 | Walker et al. |
| 2006/0146623 A1 | 7/2006 | Mizuno et al. |
| 2006/0149804 A1 | 7/2006 | Luick et al. |
| 2006/0181917 A1 | 8/2006 | Kang et al. |
| 2006/0215432 A1 | 9/2006 | Wickeraad et al. |
| 2006/0225072 A1 | 10/2006 | Lari et al. |
| 2006/0291282 A1 | 12/2006 | Liu et al. |
| 2007/0103986 A1 | 5/2007 | Chen |
| 2007/0171747 A1 | 7/2007 | Hunter et al. |
| 2007/0180006 A1 | 8/2007 | Gyoten et al. |
| 2007/0180184 A1 | 8/2007 | Sakashita et al. |
| 2007/0195602 A1 | 8/2007 | Fong et al. |
| 2007/0285131 A1 | 12/2007 | Sohn |
| 2007/0285979 A1 | 12/2007 | Turner |
| 2007/0291532 A1 | 12/2007 | Tsuji |
| 2008/0025073 A1 | 1/2008 | Arsovski |
| 2008/0037333 A1 | 2/2008 | Kim et al. |
| 2008/0052711 A1 | 2/2008 | Forin et al. |
| 2008/0137388 A1 | 6/2008 | Krishnan et al. |
| 2008/0165601 A1 | 7/2008 | Matick et al. |
| 2008/0178053 A1 | 7/2008 | Gorman et al. |
| 2008/0215937 A1 | 9/2008 | Dreibelbis et al. |
| 2009/0067218 A1 | 3/2009 | Graber |
| 2009/0154238 A1 | 6/2009 | Lee |
| 2009/0154273 A1 | 6/2009 | Borot et al. |
| 2009/0254697 A1 | 10/2009 | Akerib |
| 2010/0067296 A1 | 3/2010 | Li |
| 2010/0091582 A1 | 4/2010 | Vali et al. |
| 2010/0172190 A1 | 7/2010 | Lavi et al. |
| 2010/0210076 A1 | 8/2010 | Gruber et al. |
| 2010/0226183 A1 | 9/2010 | Kim |
| 2010/0308858 A1 | 12/2010 | Noda et al. |
| 2010/0332895 A1 | 12/2010 | Billing et al. |
| 2011/0051523 A1 | 3/2011 | Manabe et al. |
| 2011/0063919 A1 | 3/2011 | Chandrasekhar et al. |
| 2011/0093662 A1 | 4/2011 | Walker et al. |
| 2011/0103151 A1 | 5/2011 | Kim et al. |
| 2011/0119467 A1 | 5/2011 | Cadambi et al. |
| 2011/0122695 A1 | 5/2011 | Li et al. |
| 2011/0140741 A1 | 6/2011 | Zerbe et al. |
| 2011/0219260 A1 | 9/2011 | Nobunaga et al. |
| 2011/0267883 A1 | 11/2011 | Lee et al. |
| 2011/0317496 A1 | 12/2011 | Bunce et al. |
| 2012/0005397 A1 | 1/2012 | Lim et al. |
| 2012/0017039 A1 | 1/2012 | Margetts |
| 2012/0023281 A1 | 1/2012 | Kawasaki et al. |
| 2012/0120705 A1 | 5/2012 | Mitsubori et al. |
| 2012/0134216 A1 | 5/2012 | Singh |
| 2012/0134225 A1 | 5/2012 | Chow |
| 2012/0134226 A1 | 5/2012 | Chow |
| 2012/0140540 A1 | 6/2012 | Agam et al. |
| 2012/0182798 A1 | 7/2012 | Hosono et al. |
| 2012/0195146 A1 | 8/2012 | Jun et al. |
| 2012/0198310 A1 | 8/2012 | Tran et al. |
| 2012/0246380 A1 | 9/2012 | Akerib et al. |
| 2012/0265964 A1 | 10/2012 | Murata et al. |
| 2012/0281486 A1 | 11/2012 | Rao et al. |
| 2012/0303627 A1 | 11/2012 | Keeton et al. |
| 2013/0003467 A1 | 1/2013 | Klein |
| 2013/0061006 A1 | 3/2013 | Hein |
| 2013/0107623 A1 | 5/2013 | Kavalipurapu et al. |
| 2013/0117541 A1 | 5/2013 | Choquette et al. |
| 2013/0124783 A1 | 5/2013 | Yoon et al. |
| 2013/0132702 A1 | 5/2013 | Patel et al. |
| 2013/0138646 A1 | 5/2013 | Sirer et al. |
| 2013/0163362 A1 | 6/2013 | Kim |
| 2013/0173888 A1 | 7/2013 | Hansen et al. |
| 2013/0205114 A1 | 8/2013 | Badam et al. |
| 2013/0219112 A1 | 8/2013 | Okin et al. |
| 2013/0227361 A1 | 8/2013 | Bowers et al. |
| 2013/0283122 A1 | 10/2013 | Anholt et al. |
| 2013/0286705 A1 | 10/2013 | Grover et al. |
| 2013/0326154 A1 | 12/2013 | Haswell |
| 2013/0332707 A1 | 12/2013 | Gueron et al. |
| 2014/0185395 A1 | 7/2014 | Seo |
| 2014/0215185 A1 | 7/2014 | Danielsen |
| 2014/0250279 A1 | 9/2014 | Manning |
| 2014/0344934 A1 | 11/2014 | Jorgensen |
| 2015/0029798 A1 | 1/2015 | Manning |
| 2015/0042380 A1 | 2/2015 | Manning |
| 2015/0063052 A1 | 3/2015 | Manning |
| 2015/0078108 A1 | 3/2015 | Cowles et al. |
| 2015/0120987 A1 | 4/2015 | Wheeler |
| 2015/0134713 A1 | 5/2015 | Wheeler |
| 2015/0270015 A1 | 9/2015 | Murphy et al. |
| 2015/0279466 A1 | 10/2015 | Manning |
| 2015/0324290 A1 | 11/2015 | Leidel |
| 2015/0325272 A1 | 11/2015 | Murphy |
| 2015/0356009 A1 | 12/2015 | Wheeler et al. |
| 2015/0356022 A1 | 12/2015 | Leidel et al. |
| 2015/0357007 A1 | 12/2015 | Manning et al. |
| 2015/0357008 A1 | 12/2015 | Manning et al. |
| 2015/0357019 A1 | 12/2015 | Wheeler et al. |
| 2015/0357020 A1 | 12/2015 | Manning |
| 2015/0357021 A1 | 12/2015 | Hush |
| 2015/0357022 A1 | 12/2015 | Hush |
| 2015/0357023 A1 | 12/2015 | Hush |
| 2015/0357024 A1 | 12/2015 | Hush et al. |
| 2015/0357047 A1 | 12/2015 | Tiwari |
| 2016/0062672 A1 | 3/2016 | Wheeler |
| 2016/0062673 A1 | 3/2016 | Tiwari |
| 2016/0062692 A1 | 3/2016 | Finkbeiner et al. |
| 2016/0062733 A1 | 3/2016 | Tiwari |
| 2016/0063284 A1 | 3/2016 | Tiwari |
| 2016/0064045 A1 | 3/2016 | La Fratta |
| 2016/0064047 A1 | 3/2016 | Tiwari |
| 2016/0071608 A1 | 3/2016 | Bronner et al. |
| 2016/0098208 A1 | 4/2016 | Willcock |
| 2016/0098209 A1 | 4/2016 | Leidel et al. |
| 2016/0110135 A1 | 4/2016 | Wheeler et al. |
| 2016/0124873 A1* | 5/2016 | Xu ............. G06F 13/161 711/105 |
| 2016/0125919 A1 | 5/2016 | Hush |
| 2016/0154596 A1 | 6/2016 | Willcock et al. |
| 2016/0155482 A1 | 6/2016 | La Fratta |
| 2016/0188250 A1 | 6/2016 | Wheeler |
| 2016/0196142 A1 | 7/2016 | Wheeler et al. |
| 2016/0196856 A1 | 7/2016 | Tiwari et al. |
| 2016/0225422 A1 | 8/2016 | Tiwari et al. |
| 2016/0266873 A1 | 9/2016 | Tiwari et al. |
| 2016/0266899 A1 | 9/2016 | Tiwari |
| 2016/0267951 A1 | 9/2016 | Tiwari |
| 2016/0292080 A1 | 10/2016 | Leidel et al. |
| 2016/0306584 A1 | 10/2016 | Lawodny et al. |
| 2016/0306614 A1 | 10/2016 | Leidel et al. |
| 2016/0350230 A1 | 12/2016 | Murphy |

(56) References Cited

U.S. PATENT DOCUMENTS

| | | |
|---|---|---|
| 2016/0365129 A1 | 12/2016 | Willcock |
| 2016/0371014 A1* | 12/2016 | Roberts ................ G06F 3/0659 |
| 2016/0371033 A1 | 12/2016 | La Fratta et al. |
| 2017/0052906 A1 | 2/2017 | Lea |
| 2017/0178701 A1 | 6/2017 | Willcock et al. |
| 2017/0192844 A1 | 7/2017 | Lea et al. |
| 2017/0228192 A1 | 8/2017 | Willcock et al. |
| 2017/0235515 A1 | 8/2017 | Lea et al. |
| 2017/0236564 A1 | 8/2017 | Lawodny et al. |
| 2017/0242902 A1 | 8/2017 | Crawford et al. |
| 2017/0243623 A1 | 8/2017 | Kirsch et al. |
| 2017/0249104 A1 | 8/2017 | Moon et al. |
| 2017/0262369 A1 | 9/2017 | Murphy |
| 2017/0263306 A1 | 9/2017 | Murphy |
| 2017/0269865 A1 | 9/2017 | Willcock et al. |
| 2017/0269903 A1 | 9/2017 | Tiwari |
| 2017/0277433 A1 | 9/2017 | Willcock |
| 2017/0277440 A1 | 9/2017 | Willcock |
| 2017/0277581 A1 | 9/2017 | Lea et al. |
| 2017/0277637 A1 | 9/2017 | Willcock et al. |
| 2017/0278559 A1 | 9/2017 | Hush |
| 2017/0278584 A1 | 9/2017 | Rosti |
| 2017/0285988 A1 | 10/2017 | Dobelstein |
| 2017/0293434 A1 | 10/2017 | Tiwari |
| 2017/0301379 A1 | 10/2017 | Hush |
| 2017/0309314 A1 | 10/2017 | Zawodny et al. |
| 2017/0329577 A1 | 11/2017 | Tiwari |
| 2017/0336989 A1 | 11/2017 | Zawodny et al. |
| 2017/0337126 A1 | 11/2017 | Zawodny et al. |
| 2017/0337953 A1 | 11/2017 | Zawodny et al. |
| 2017/0352391 A1 | 12/2017 | Hush |
| 2017/0371539 A1 | 12/2017 | Mai et al. |
| 2018/0012636 A1 | 1/2018 | Alzheimer et al. |
| 2018/0024769 A1 | 1/2018 | Howe et al. |
| 2018/0024926 A1 | 1/2018 | Penney et al. |
| 2018/0025759 A1 | 1/2018 | Penney et al. |
| 2018/0025768 A1 | 1/2018 | Hush |
| 2018/0032458 A1 | 2/2018 | Bell |
| 2018/0033478 A1 | 2/2018 | Lea et al. |
| 2018/0039484 A1 | 2/2018 | La Fratta et al. |
| 2018/0046405 A1 | 2/2018 | Hush et al. |
| 2018/0046461 A1 | 2/2018 | Tiwari |
| 2018/0060069 A1 | 3/2018 | Rosti et al. |
| 2018/0074754 A1 | 3/2018 | Crawford |
| 2018/0075899 A1 | 3/2018 | Hush |
| 2018/0088850 A1 | 3/2018 | Willcock |

FOREIGN PATENT DOCUMENTS

| | | |
|---|---|---|
| EP | 2026209 | 2/2009 |
| JP | H0831168 | 2/1996 |
| JP | 2009259193 | 3/2015 |
| KR | 10-0211482 | 8/1999 |
| KR | 10-2010-0134235 | 12/2010 |
| KR | 10-2013-0049421 | 5/2013 |
| WO | 2001065359 | 9/2001 |
| WO | 2010079451 | 7/2010 |
| WO | 2013062596 | 5/2013 |
| WO | 2013081588 | 6/2013 |
| WO | 2013095592 | 6/2013 |

OTHER PUBLICATIONS

Kogge, et al., "Processing in Memory: Chips to Petaflops," May 23, 1997, (8 pgs.), retrieved from: http://www.cs.ucf.edu/courses/cda5106/summer02/papers/kogge97PIM.pdf.

Draper, et al., "The Architecture of the DIVA Processing-in-Memory Chip," Jun. 22-26, 2002, (12 pgs.), ICS '02, retrieved from: http://www.isi.edu/~draper/papers/ics02.pdf.

Adibi, et al., "Processing-in-Memory Technology for Knowledge Discovery Algorithms," Jun. 25, 2006, (10 pgs.), Proceeding of the Second International Workshop on Data Management on New Hardware, retrieved from: http://www.cs.cmu.edu/~damon2006/pdf/adibi06inmemory.pdf.

U.S. Appl. No. 13/449,082, entitled, "Methods and Apparatus for Pattern Matching," filed Apr. 17, 2012, (37 pgs.).

U.S. Appl. No. 13/743,686, entitled, "Weighted Search and Compare in a Memory Device," filed Jan. 17, 2013, (25 pgs.).

U.S. Appl. No. 13/774,636, entitled, "Memory as a Programmable Logic Device," filed Feb. 22, 2013, (30 pgs.).

U.S. Appl. No. 13/774,553, entitled, "Neural Network in a Memory Device," filed Feb. 22, 2013, (63 pgs.).

U.S. Appl. No. 13/796,189, entitled, "Performing Complex Arithmetic Functions in a Memory Device," filed Mar. 12, 2013, (23 pgs.).

International Search Report and Written Opinion for PCT Application No. PCT/US2013/043702, dated Sep. 26, 2013, (11 pgs.).

Pagiamtzis, et al., "Content-Addressable Memory (CAM) Circuits and Architectures: A Tutorial and Survey", Mar. 2006, (16 pgs.), vol. 41, No. 3, IEEE Journal of Solid-State Circuits.

Pagiamtzis, Kostas, "Content-Addressable Memory Introduction", Jun. 25, 2007, (6 pgs.), retrieved from: http://www.pagiamtzis.com/cam/camintro.

Debnath, Biplob, Bloomflash: Bloom Filter on Flash-Based Storage, 2011 31st Annual Conference on Distributed Computing Systems, Jun. 20-24, 2011, 10 pgs.

Derby, et al., "A High-Performance Embedded DSP Core with Novel SIMD Features", Apr. 6-10, 2003, (4 pgs), vol. 2, pp. 301-304, 2003 IEEE International Conference on Accoustics, Speech, and Signal Processing.

"4.9.3 MINLOC and MAXLOC", Jun. 12, 1995, (5pgs.), Message Passing Interface Forum 1.1, retrieved from http://www.mpi-forum.org/docs/mpi-1.1/mpi-11-html/node79.html.

Stojmenovic, "Multiplicative Circulant Networks Topological Properties and Communication Algorithms", (25 pgs.), Discrete Applied Mathematics 77 (1997) 281-305.

Boyd et al., "On the General Applicability of Instruction-Set Randomization", Jul.-Sep. 2010, (14 pgs.), vol. 7, Issue 3, IEEE Transactions on Dependable and Secure Computing.

Elliot, et al., "Computational RAM: Implementing Processors in Memory", Jan.-Mar. 1999, (10 pgs.), vol. 16, Issue 1, IEEE Design and Test of Computers Magazine.

International Search Report and Written Opinion for related PCT Application No. PCT/US2019/026974, dated Aug. 2, 2019, 10 pages.

* cited by examiner

COMMAND SELECTION POLICY WITH READ PRIORITY

PRIORITY INFORMATION

This application is a Continuation of U.S. application Ser. No. 15/951,896, filed Apr. 12, 2018, the contents of which are included herein by reference.

TECHNICAL FIELD

The present disclosure relates generally to memory, and more particularly, to apparatuses and methods associated with command selection policy with read priority.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instruction (e.g., a program, applications, etc.). A memory system can implement a scheduling policy used to determine an order in which memory access requests (e.g., read and write commands) received from the processing resource(s) are executed by the memory system. Such scheduling policies can affect computing system performance since program execution time on the computing system is affected by the execution time of the respective memory access requests, for example.

DETAILED DESCRIPTION

Figure 1:
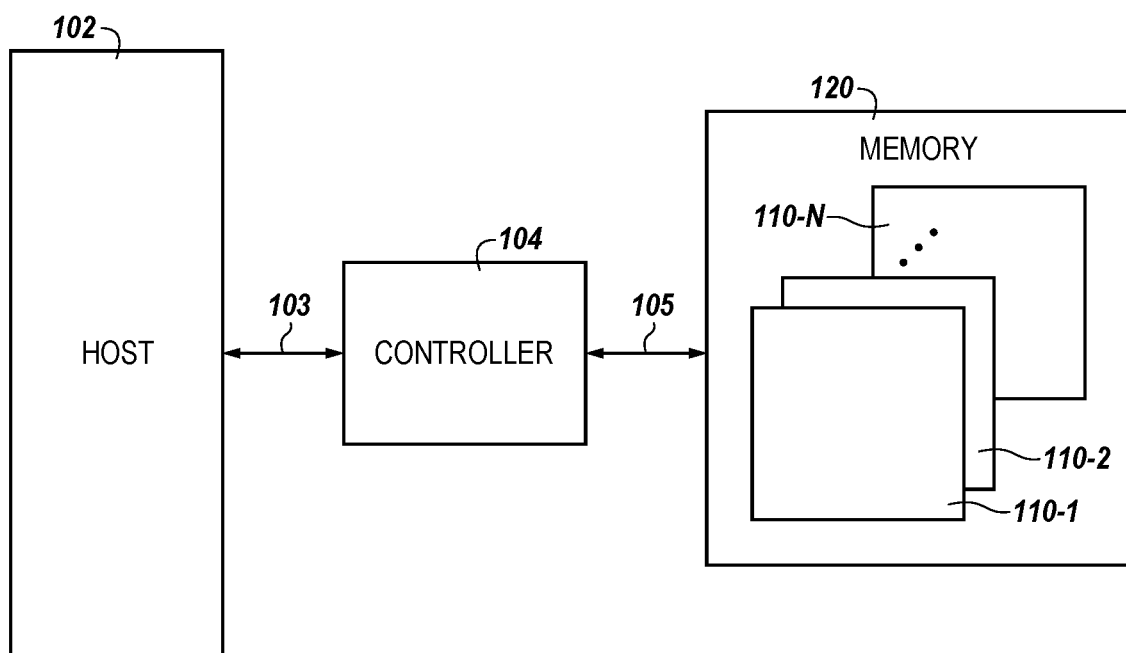
FIG. 1 is a block diagram of an apparatus in the form of a computing system including a memory system and capable of implementing a command selection policy in accordance with a number of embodiments of the present disclosure.

The present disclosure includes apparatuses and methods related to command selection policy. An example method can include receiving a read command to a memory controller, wherein the read command comprises an address for a bank and a channel of a memory device, inserting the read command into a queue of the memory controller, blocking a first number of write commands to the bank, issuing, to the memory device, an activation command associated with the read command, blocking a second number of write commands to the channel, and issuing the read command to the memory device. As used herein, blocking commands can also be referred to as deprioritizing commands.

A number of embodiments of the present disclosure can provide an improved command selection policy as compared to previous approaches. For instance, some prior command selection policies include FCFS (first-come, first-served) and FRFCFS (first-ready, first-come, first-served). A FCFS policy can include scheduling commands received to a memory controller for execution by a memory device (e.g., a main memory such as a DRAM device) based on the order in which the commands were received by (e.g., decoded) the controller. Therefore, in such cases, oldest commands are executed first. However, various memory systems include timing constraints that can affect whether a command can be issued (e.g., from the memory controller to the memory device). For example, various support circuitry associated with a memory array (e.g., row decode circuitry, column decode circuitry, sense amplifier circuitry, pre-charge circuitry, refresh circuitry, etc.) can include timing constraints that determine when/if a particular command is ready for execution by the memory device. Accordingly, a FCFS policy can increase execution latency since a newer command may be ready for issuance to the memory device (e.g., based on the timing constraints) but the command cannot be sent to the memory device until the older command is executed.

A FRFCFS policy can reduce latency as compared to a FCFS policy. For example, in the FRFCFS policy, a memory controller may iterate through the command queue and select the first command it encounters that is ready to be issued. Therefore, an older command not yet ready may be skipped over in favor of a newer pending command that is ready.

As an example, a FRFCFS policy may include prioritizing column commands over row commands such that the policy includes searching the command queue for the oldest column command ready to be issued and if an issuable column command is not found, the oldest row command that is ready to be issued is selected for issuance to the memory device. As those skilled in the art appreciate, memory and storage arrays may be organized logically or physically, or both, in columns and rows. So, as used herein, a "column" command refers to a command directed to an address corresponding to an open (e.g., activated) row (e.g., page) of an array of the memory device, and a "row" command refers to a command directed to an address corresponding to a closed (e.g., deactivated) row of the array.

In some implementations, neither a FCFS policy nor a FRFCFS policy prioritizes read commands (e.g., over write commands). Prioritizing read commands can improve system performance since various instructions executed by a processing resource (e.g., a central processing unit) can be dependent on execution of other instructions. For example, various instructions to be executed by a CPU may be dependent upon a read command issued to a memory system. Therefore, the dependent instructions in such implementations might not be executed by the CPU until the data corresponding to the read command is returned to the CPU. As such, delay in execution of read commands sent to the memory system can result in delay in program execution.

A number of embodiments of the present disclosure can implement a command selection policy that prioritizes read commands (e.g., both column read commands and row read commands) over write commands, which can provide benefits such as reducing latency associated with read access requests to memory, among other benefits. As described further herein, a number of embodiments include implementing a command selection policy that has similarities to a FRFCFS policy along with a strict read priority. A number of embodiments can be implemented via execution of instructions stored on machine-readable media, which can include various non-transitory media including, but not limited to, volatile and/or nonvolatile memory, such as solid-state memories, phase-change memory, ferroelectric memory, optical media, and/or magnetic media among other types of machine readable media.

With a strict read priority policy, if the memory controller is in the process of issuing write commands and one or more read commands enter a queue (e.g., command queue), the memory controller can cease issuing write commands to service the read commands. Although, a strict read priority can lead to low latency for the read commands due to various factors, the read commands may not be ready for immediate issuance at the time that they enter the queue. A policy in which a memory controller blocks write commands can leave a bus unnecessarily idle. For example, a bus can be unnecessarily idle between a time in which the memory controller blocks a write command and a time when a read command is ready to issue.

Upon adding a read command to the queue, the memory controller can block outstanding writes that are ready to issue even though the read command is not ready to issue. The memory controller can cease issuing further write commands causing a duration of time in which the bus is idle. During the idle bus time the memory controller can issue pre-charge ("PRE") commands and/or activate ("ACT") command to prepare the memory device for the read command. The memory controller can unnecessarily cease issuing write commands given that the read command is not ready for issuance. The pre-charge commands can be a row pre-charge command.

Some embodiments can prevent the memory controller from unnecessarily ceasing to issue write commands. For example, the memory controller can cease issuing write commands if read commands are ready to be issued. However, timing constraints of a memory device can dictate that pending write commands become issuable before pending read commands become issuable if a most recently issued command was a write command.

The memory controller may continue to issue the write commands until there are no write commands left in a queue, at which point the memory controller may issue the read. An unintended effect of the decision to delay blocking the write commands is that the read command may no longer receive priority over the write commands. The issuance of the read command may be further delayed if additional write commands are added to the queue and become issuable before the pending read command becomes issuable. Delaying the issuance of the read command to issue the write commands and continuing to issue write command until the write commands in a queue are processed may be referred to as "read starvation." That is, read starvation can describe the delaying of blocking write commands which can result in further undesirable delays for issuing a read command given that new issuable write commands may be added to a queue and become issuable before the pending read command becomes issuable.

Another challenge is that, although the memory device may be in a state in which it can allow a read command to an open row, there may be pending read commands to closed rows. These read commands may not become issuable until their associated rows are opened. If a bank which is being accessed by a read command has a row open other than the row accessed by that read command, then the controller may issue a pre-charge command to the row accessed by the read command of the bank prior to issuing the read command.

The command selection policy may force the pre-charge commands and activate commands to prepare for the pending reads, while allowing the issuing of write commands, provided that they don't delay the pre-charge commands, the activate commands, and the read commands to an unacceptable degree. That is, the command selection policy can enforce a read command priority for read commands to specific channels and/or banks while allowing the issuance of write commands to different channels and/or banks.

The command selection policy and the examples described herein can be implemented using DRAM devices, ferroelectric random access memory (FeRAM) devices, and 3D)(Point™ (3DXP) devices, among other types of memory.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system including a memory system 120 and capable of implementing a command selection policy in accordance with a number of embodiments of the present disclosure. As used herein, an "apparatus" can refer to, but is not limited to, a variety of structures or combinations of structures, such as a circuit or circuitry, a die or dice, a module or modules, a device or devices, or a system or systems. For example, controller 104, host 102, system 120, and/or devices 110-1 to 110-N may separately be referred to as an "apparatus."

The system 120 can comprise multiple channels each having a number of devices 110-1 to 110-N corresponding thereto. The devices 110-1 to 110-N can collectively be referred to as devices 110. Each of the devices 110 can be, for example, a "chip" comprising multiple banks. The controller 104 can service multiple memory channels or the controller 104 can be implemented as multiple separate controllers (e.g., one for each channel). For example, the system 120 can comprise a plurality of modules (e.g., dual in-line memory modules (DIMMs)).

In this example, the computing system includes a host 102 coupled to a controller 104 (e.g., via an interface 103), which is coupled to the memory system 120 (e.g., via an interface 105). The computing system can be a laptop computer, personal computers, digital camera, digital recording and playback device, mobile telephone, PDA, memory card reader, interface hub, sensor, Internet-of-Things (IoT) enabled device, among other systems, and the host 102 can include a number of processing resources (e.g., one or more processors) capable of accessing memory 120 (e.g., via controller 104). The host 102 may be responsible for execution of an operating system (OS) and/or various applications that can be loaded thereto (e.g., from memory system 120 via controller 104).

The controller 104 may receive memory access requests (e.g., in the form of read and write commands, which may be referred to as load and store commands, respectively) from the host 102. The controller 104 can transfer commands and/or data between the host 102 and the memory system 120 over the interfaces 103 and 105, which can comprise physical interfaces such as buses, for example, employing a suitable protocol. Such protocol may be custom or proprietary, or one or both interfaces 103 and 105 may employ a standardized protocol, such as Peripheral Component Interconnect Express (PCIe), Gen-Z, CCIX, or the like.

As an example, the interfaces 103 and 105 may comprise combined address, command, and data buses or separate buses for respective address, command, and data signals. The controller 104 can comprise control circuitry, in the form of hardware, firmware, or software, or any combination of the three. As an example, the controller 104 can comprise a state machine, a sequencer, and/or some other type of control circuitry, which may be implemented in the form of an application specific integrated circuit (ASIC) coupled to a printed circuit board. In a number of embodiments, the controller 104 may be co-located with the host 102 (e.g., in a system-on-chip (SOC) configuration). Also, the controller 104 may be co-located with the memory system 120. The controller 104 can be, for example, a controller such as a controller comprising issue unit 322 in FIG. 3 and can be configured to implement a command selection policy in accordance with a number of embodiments of the present disclosure as described further below.

As shown in FIG. 1, the memory system 120 includes a number of memory devices 110-1, 110-2, ..., 110-N, which may be referred to collectively as memory 110. The memory 110 can comprise a number of physical memory "chips," or dice which can each include a number of arrays (e.g., banks) of memory cells and corresponding support circuitry (e.g., address circuitry, I/O circuitry, control circuitry, read/write circuitry, etc.) associated with accessing the array(s) (e.g., to read data from the arrays and write data to the arrays). As an example, the memory devices 110-1 to 110-N can include a number of DRAM devices, SRAM devices, PCRAM devices, RRAM devices, FeRAM, phase-change memory, 3DXP, and/or Flash memory devices. In a number of embodiments, the memory system 110 can serve as main memory for the computing system.

Figure 2:
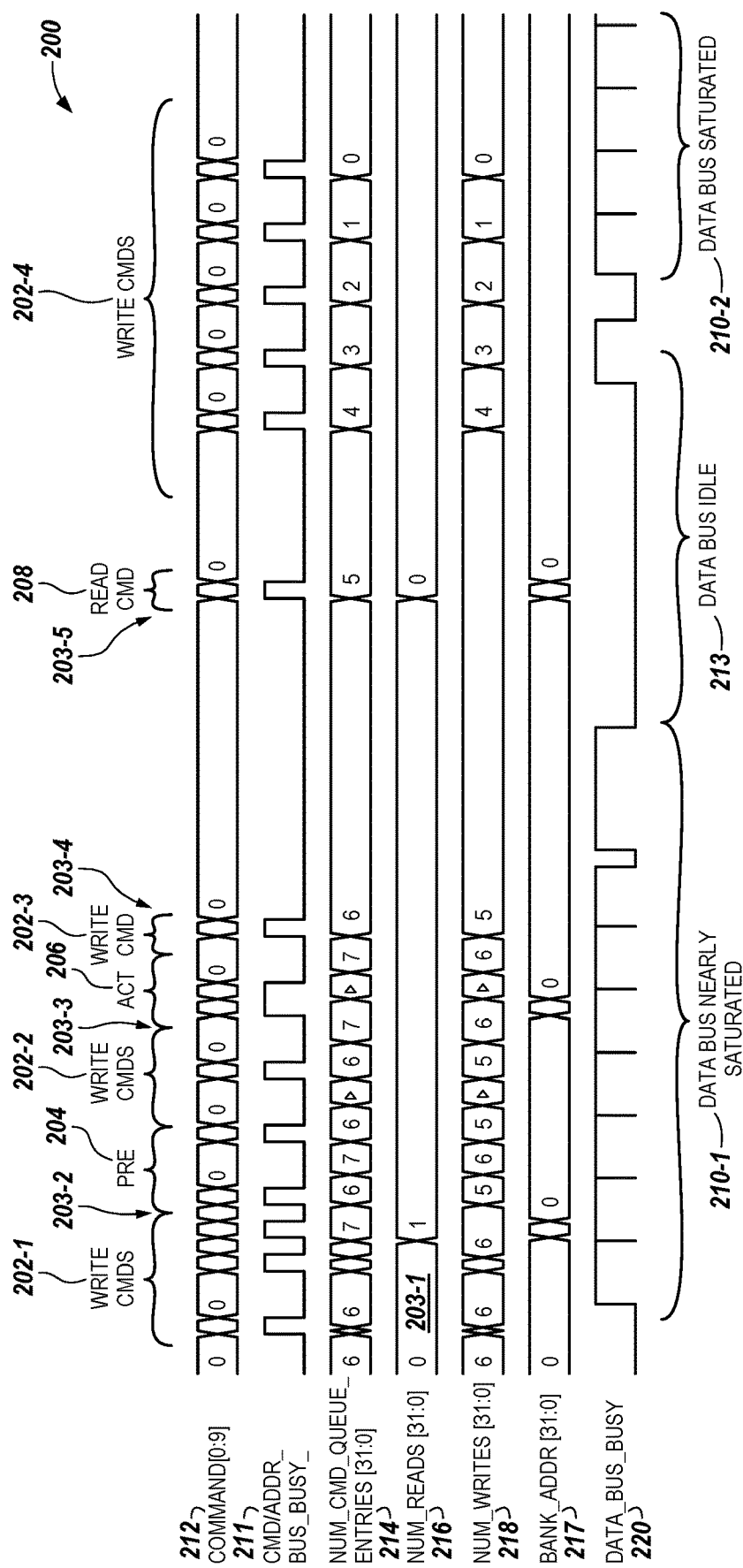
FIG. 2 is a timing diagram for command selection in accordance with a number of embodiments of the present disclosure.

FIG. 2 is a timing diagram 200 for command selection in accordance with a number of embodiments of the present disclosure. The timing diagram 200 shows signals 212 (COMMAND), 211 (CMD/ADDR_BUS_BUSY_), 214 (NUM_CMD_QUEUE_ENTRIES), 216 (NUM_READS), 218 (NUM_WRITES), 217 (BANK_ADDRESS), and 220 (DATA_BUS_BUSY).

Signal 212 indicates commands provided from a memory controller (e.g., 104) to a memory device (e.g., 110). The commands corresponding to signal 212 can include activation commands (ACT), pre-charge commands (PRE), read commands, and/or write commands, among other possible commands that the controller can provide to the memory device. Signal 211 indicates a command/address bus status associated with executing commands. Signal 214 indicates the quantity of entries (e.g., read and write commands) in a command queue. Signal 216 indicates the quantity of pending read commands in the queue (e.g., commands remaining to be issued). Signal 218 indicates the quantity of pending write commands in the queue. Signal 217 indicates the bank address to which commands are directed. Signal 220 indicates a data bus status corresponding to a data bus between the controller and the memory device (e.g., a data bus of interface 105 shown in FIG. 1).

In accordance with various embodiments of the present disclosure, an issue unit (e.g., 322) of a memory controller can block the issuance of write commands on a channel of a memory device in two stages, which can prevent unnecessarily ceasing issuance of write commands in order to issue a prioritized read command. As shown in FIG. 2, a read command is added to a queue (e.g., signal 216 transitions from "0" to "1" and signal 214 transitions from "6" to "7" as shown at 203-1). In this example, the read and write commands access a same bank, which may be referred to as bank "B." Prior to receiving the read command the controller receives and issues write commands 202-1. Responsive to receiving the read command, the issue unit can block further write command issuances to that bank and issue a pre-charge command 204 (e.g., at time 203-2) and an activation command 206 (e.g., at time 203-3) to make the received read issuable. After issuing the activation command 206 (e.g., to the target row), the issue unit can block write command issuances to the corresponding channel (e.g., at time 203-4). Blocking write command issuances to the channel can allow the read command to eventually become issuable 208 (e.g., while avoiding read starvation due to subsequent writes to the channel). Once the read becomes issuable, the issue unit selects and issues the read command 208 (at time 203-5).

In a number of embodiments, timing constraints associated with a memory device may prevent a read from becoming issuable immediately after its activation command (e.g., 206) issues. Therefore, in order to avoid gaps in data bus activity, it may be beneficial to delay blocking of the channel until a particular amount of time has passed since the issuance of the activation command. In a number of embodiments, the delay may be equal to a difference between $t_{RCD}$ (row-to-column delay) and $t_{WTR}$ (write-to-read delay) (e.g., $t_{RCD}-t_{WTR}$), where $t_{RCD}$ corresponds to the number of clock cycles between opening a row and accessing columns within it, and $t_{WTR}$ corresponds to the number of clock cycles required between a valid write command and a next read command. For instance, as shown in FIG. 2, a write command 202-3 is issued to the channel subsequent to the activation command 206, which would not be possible if the controller had blocked the channel immediately subsequent to issuance of the activation command 206. Accordingly, the example shown in FIG. 2 illustrates a write command 202-3 being issued sometime before expiration of the wait time $t_{RCD}-t_{WTR}$.

To enable the implementation of the wait time (e.g., $t_{RCD}-t_{WTR}$) associated with blocking the channel, the issue unit may retain a timestamp for each activation command (e.g., 206). Accordingly, a received read command will not result in blocking of the channel until $t_{RCD}-t_{WTR}$ has passed since the corresponding activation command 206 has issued.

The timing diagram 200 shows a timing of command issuances using separate bank and channel blockings. For example, the particular bank to which the received read command is directed may be blocked responsive to receiving the read command. However, as shown, the issue unit may continue to issue write commands (e.g., 202-2) to other banks of the channel prior to blocking all writes to the channel, which can reduce idle time of the data bus (e.g., as shown by signal 220). Subsequent to issuing the activation command 206, the issue unit can block writes to the channel. However, as noted above, bus idle time can be further reduced by delaying the blocking of the channel until after time $t_{RCD}-t_{WTR}$ has passed since issuance of the activation command 206 (e.g., as indicated by issuance of write command 202-3).

As shown in FIG. 2, the read command 208 is given priority over previously received (e.g., "older") write commands in order to reduce read latency. For example, as indicated by signals 214 and 218, despite being received by the issue unit prior in time to the read command, the issuance of write commands 202-4 is delayed until after issuance of the read command.

Utilizing a read priority command selection policy can involve the memory controller elevating the priority of write commands when one or more newer read commands access a same row as the write (e.g., due to a "read-after-write dependence"). Accounting for read-after-write dependence in association with a read priority command selection policy can result in issuing dependent read commands (e.g., commands that are not to issue until after one or more subsequently received writes to the same row) sooner than they would otherwise have issued. For the purposes of the scheduling policy described herein, a write command that is elevated in priority (e.g., due to a read-after-write dependence) can be given a same priority as a read command.

However, to avoid violating timing constraints of a memory device, the delay time associated with blocking the channel (e.g., the delay subsequent to issuance of the row activation command) can be adjusted for elevated write commands (e.g., as compared to read commands). For example, for elevated write commands, the delay can be $t_{RCD}-t_{CCD}$ rather than $t_{RCD}-t_{TWR}$ where $t_{CCD}$ is the column-to-column delay (e.g., the number of clock cycles required between successive writes to an activated row). Example command selection policies such as that described in FIG. 2 (e.g., policies that include read priority in association with bank and channel blocking), are described in further detail below in association with FIGS. 3-6. Various embodiments provide benefits such as reducing bus idle time as compared to some previous command selection policies providing read priority.

A command whose execution priority level has been elevated (e.g., as part of a command selection policy) can be referred to as an elevated command. For example, an elevated write command can refer to a write command whose execution priority level is elevated as compared to other write commands in a command queue (e.g., due to a read-after-write dependence associated with the write command).

In various instances, a read command can be directed to a bank in which a read-after-write dependence is occurring. In such cases, the read command can involve sending a pre-charge command to the bank in order to activate the row to which the read is directed. However, due to the read-after-write dependence occurring on the bank, it can be preferable to allow write command(s) to the row to occur so that the read command having the dependence can execute. Accordingly, embodiments of the present disclosure can include blocking pre-charge commands to banks through which a read-after-write dependence is occurring.

Figure 3:
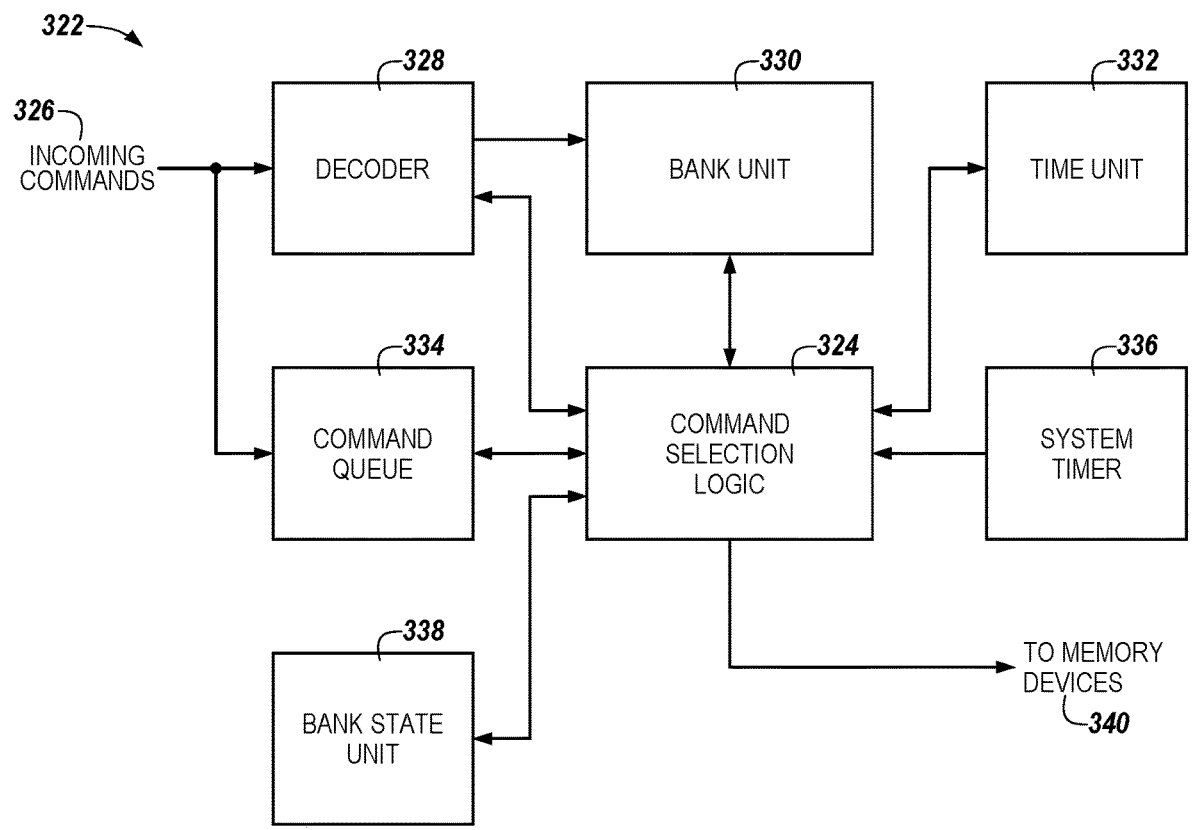
FIG. 3 is a block diagram of an issue unit of a controller capable of implementing a command selection policy in accordance with a number of embodiments of the present disclosure.
Figure 4:
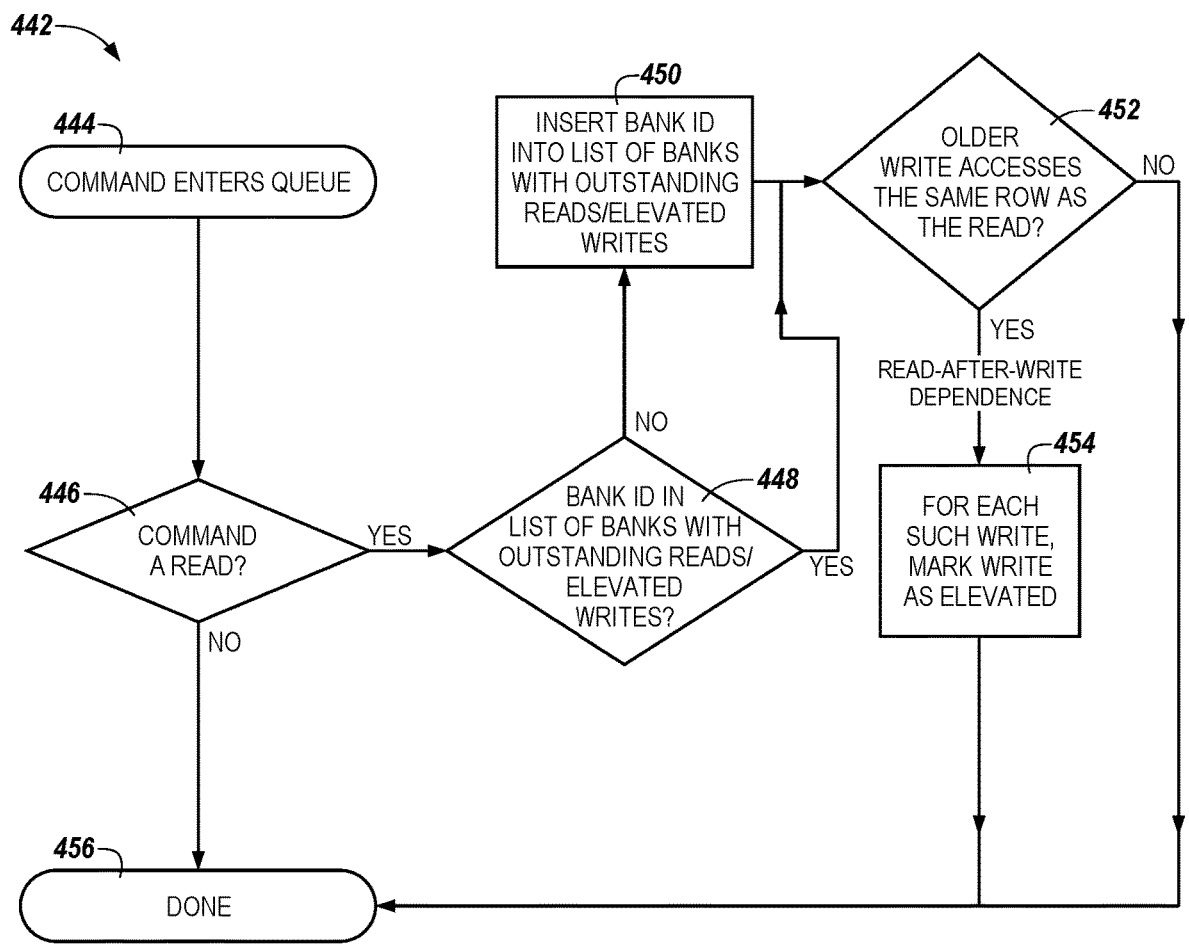
FIG. 4 illustrates a flow chart associated with implementing a command selection policy in accordance with a number of embodiments of the present disclosure.

FIG. 3 is a block diagram of an issue unit 322 of a controller (e.g., 104) capable of implementing a command selection policy in accordance with a number of embodiments of the present disclosure (e.g., such as those described in association with FIGS. 4-6). The issue unit 322 includes a decoder 328, a bank unit 330, a time unit 332, a command queue 334, command selection logic 324, a system timer 336, a bank state unit 338, and a bus 340 to a memory device.

The issue unit 322 can receive incoming commands 326 (e.g., read and/or write commands). The commands 326 can be placed in a command queue 334 and their corresponding addresses (e.g., rank address, bank address, etc.) can be decoded by the decoder 328. The bank unit 330 can provide indications (e.g., via one or more lists) of those banks having particular characteristics. For example, bank unit 330 can indicate bank addresses (e.g., bank IDs) associated with outstanding read commands and/or elevated write commands.

The command queue 334 can comprise one or more queues. For example, the command queue 334 can comprise a first queue configured to receive the incoming commands 326 and a number of "prioritized" queues. As an example, the command selection logic 324 can be configured to place each of the incoming commands 326 into one of a plurality of queues indexed in priority order. For instance, a highest priority queue might include column read commands, a second highest priority queue might include row read commands, a third highest priority queue might include column write commands, and a fourth highest priority queue might include row write commands. Commands can be placed in the prioritized queues in accordance with various command selection policies such as those described herein. The command queue 334 can be, for example, a first-in first-out (FIFO) queue(s).

As used herein, the term "queue" is not intended to be limited to a specific data structure implementation, but rather the term queue can refer to a collection of elements organized in various manners and which can have characteristics of one or more different types of queues and/or lists (e.g., a list, a linked list, etc.), among others.

The system timer 336 provides the time (e.g., 0 picosecond (ps), 1 ps, 2 ps, etc.), while the command selection logic 324 and/or time unit 332 samples the times from the system timer 336, logs the sampled times, and uses the sampled times in conjunction with the device's timing parameters (e.g., timing parameters associated with operating the memory devices 340 or other components of the system comprising the memory devices 340 and issue unit 322), to determine the issuability of the outstanding commands.

Such timing parameters can include timing constraints such as those described above (e.g., $t_{RCD}$, $t_{WTR}$, $t_{CCD}$ etc.). The time unit 332 can provide timestamps for use in implementing the command selection policy. For example, the time unit 332 can provide timestamps for row activation commands, which can be used in association with determining suitable times at which to perform channel blocking. The bank state unit 338 can indicate the state of various banks corresponding to the memory devices 340. For instance, the bank state unit 338 can indicate whether banks are currently blocked.

The command selection logic 324 is configured to implement command selection policies described herein. For example, in operation, the command selection logic 324 is configured to maintain the lists associated with bank unit 330 and command queue 334. The command queue 334 selects commands (e.g., from command queue 334) for issuance to memory devices 340 based on input from various components. The command selection logic 324 can select the commands 326 stored in the command queue 334 for issuance using the row activation times provided by the time unit 332, the bank states provided by the bank states unit 338, the list of banks provided by the bank unit 330, and data provided by the decoder 328 and the system timer 336.

In some examples, the command selection logic 324 is configured to communicate with the decoder 328. For example, the command selection logic 324 can request banks and/or rows associated with the commands 326. The command selection logic 324 can also request a list of banks and/or rows with outstanding read commands and/or elevated write commands from the bank unit 330. That is, the bank unit 330 can store bank and/or row data associated with the commands 326. The command selection logic 324 can compare a bank and/or row received from the decoder 328 and corresponding to a command 326 to a list of banks and/or rows provided by the bank unit 330 to determine whether a read-after-write dependence exists. In some examples, the read-after-write dependence can be a function of the row address of the commands 326 rather than the bank address of the commands.

The command selection logic 324 can also log times associated with commands using the time unit 332 and the system timer 336. For example, the command selection logic 324 can receive a first time provided by the system timer 336 and associate the time with an activation command. The command selection logic 324 can also receive a second time provided by the system timer 336 to determine whether a duration of time has expired sufficient to issue a read command and/or to block write commands from issuing. The command selection logic 324 can request times associated with activation commands and can update times associated with activation commands. For example, the command selection logic 324 can provide an identifier (ID) associated with an activation command and/or a time associated with the activation command and/or the activation command ID to store and/or update a time associated with an activation command. The components of the issue unit 322 can comprise hardware, firmware, and/or software.

FIG. 4 illustrates a flow chart 442 associated with implementing a command selection policy in accordance with a number of embodiments of the present disclosure. The method described in the flow chart 442 can be executed, for example, by an issue unit such as issue unit 322 shown in FIG. 3.

At 444, a command enters the queue (e.g., a command queue 334). At 446, a determination is made regarding whether the command is a read command. If the command is not a read command (e.g., the command is a write command), no further action is necessary and the method shown in flow chart 442 terminates at 456.

Responsive to a determination (e.g., at 446) that the command is a read command, at 448 a determination is made regarding whether the bank ID associated with the read command is in a list of banks with outstanding read commands and/or elevated write commands (e.g., the bank ID of the read command is compared with the list of bank IDs in a bank unit such as 330 shown in FIG. 3). Responsive to a determination that the bank ID associated with the read command is in the list of banks, flow continues to 452 where a determination is made regarding whether the queue contains any older writes to the same row as the row to which the read is directed (e.g., in order to determine whether a read-after-write dependence exists for the read command).

Responsive to a determination (e.g., at 448) that the bank ID of the read is not on the list of banks with outstanding read commands and/or elevated write commands, at 450 the bank ID is added to the list of banks with outstanding read commands and/or elevated write commands (e.g., the list maintained by a bank unit such as 330), and the flow continues to 452 where a read-after-write dependence check is made.

As used herein, the terms "old" and "new" are used to reference the relative time commands have been in the command queue. For example, referring to a command as "older" relative to other commands indicates it entered the command queue prior to the other commands. For instance, commands entering the command queue (e.g., at 444) will be newer than those commands already in the command queue.

Responsive to determining (e.g., at 452) that one or more older write command accesses a same row as the read command (e.g., such that a read-after-write dependence exists), at 454 each such older write command is marked as an elevated write command (e.g., the priority of those write commands is increased in order to ensure they issue prior to some other read commands that may otherwise have higher priority according to the selection policy), and the flow terminates as shown at 456. Responsive to determining (e.g., at 452) that no older write commands access the same row as the read command (e.g., no read-after-write dependence exists), flow terminates as shown at 456.

Figure 5A:
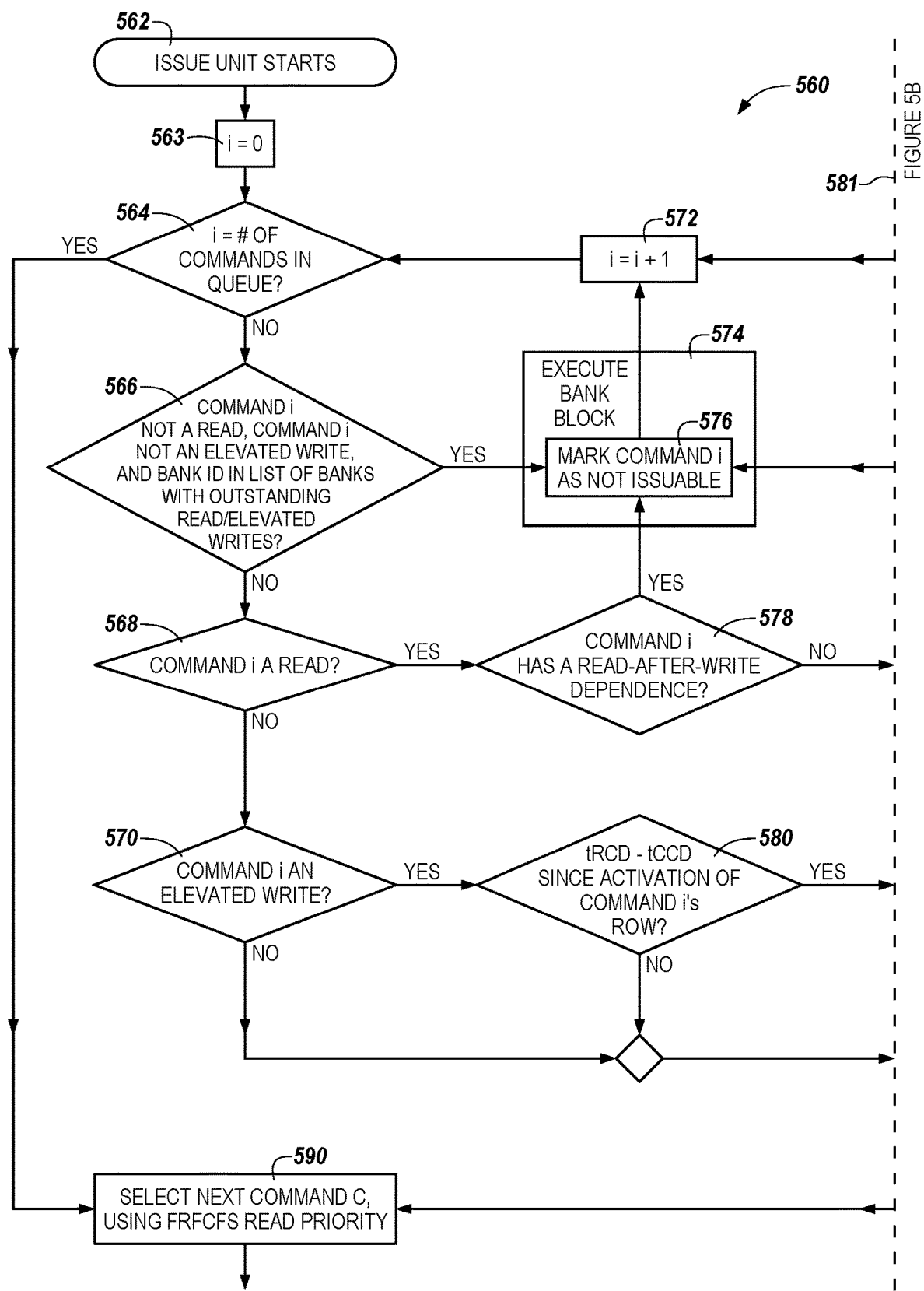
FIGS. 5A, 5B, and 5C illustrate a flow chart associated with implementing a command selection policy in accordance with a number of embodiments of the present disclosure.
Figure 5B:
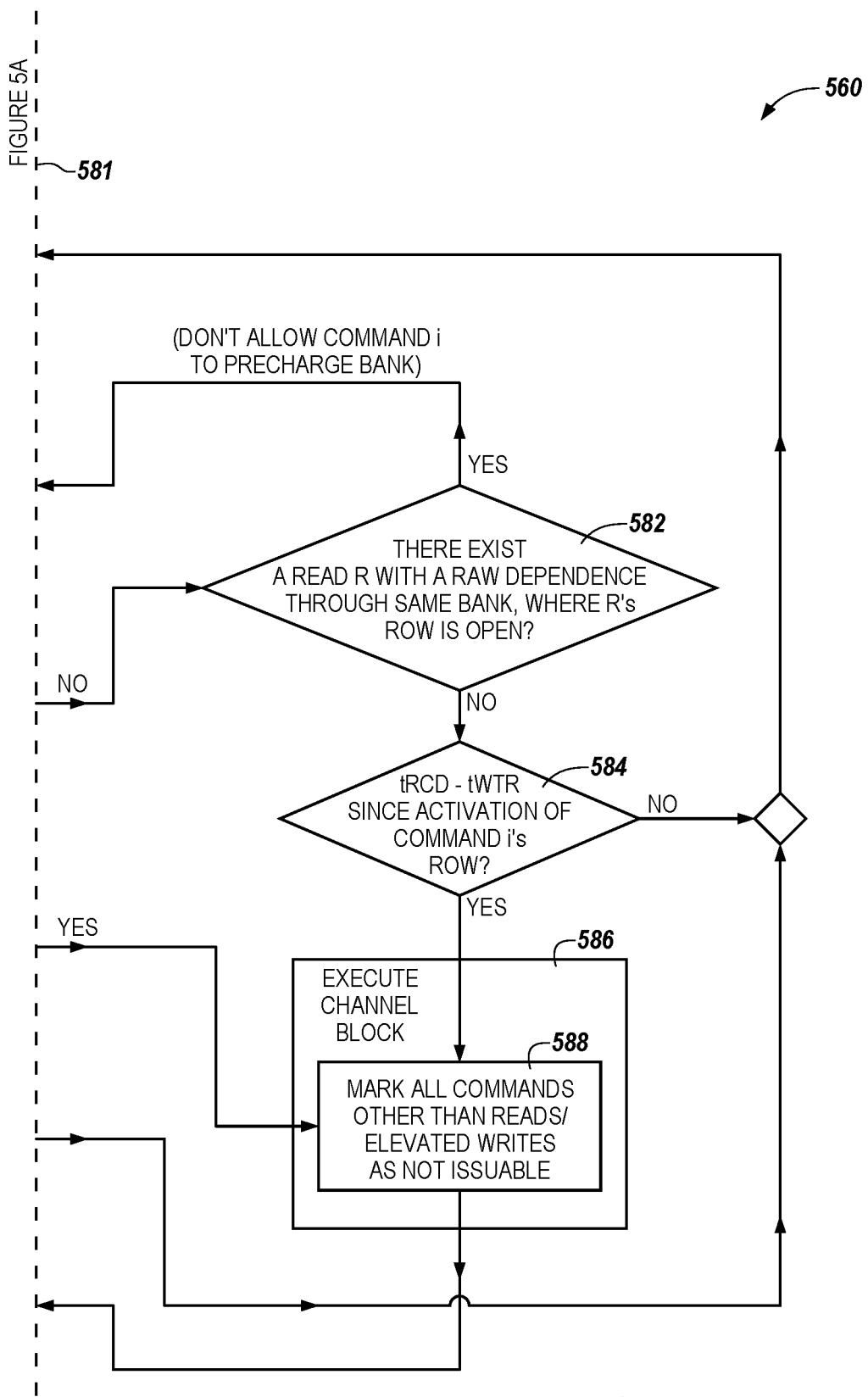
Figure 5C:
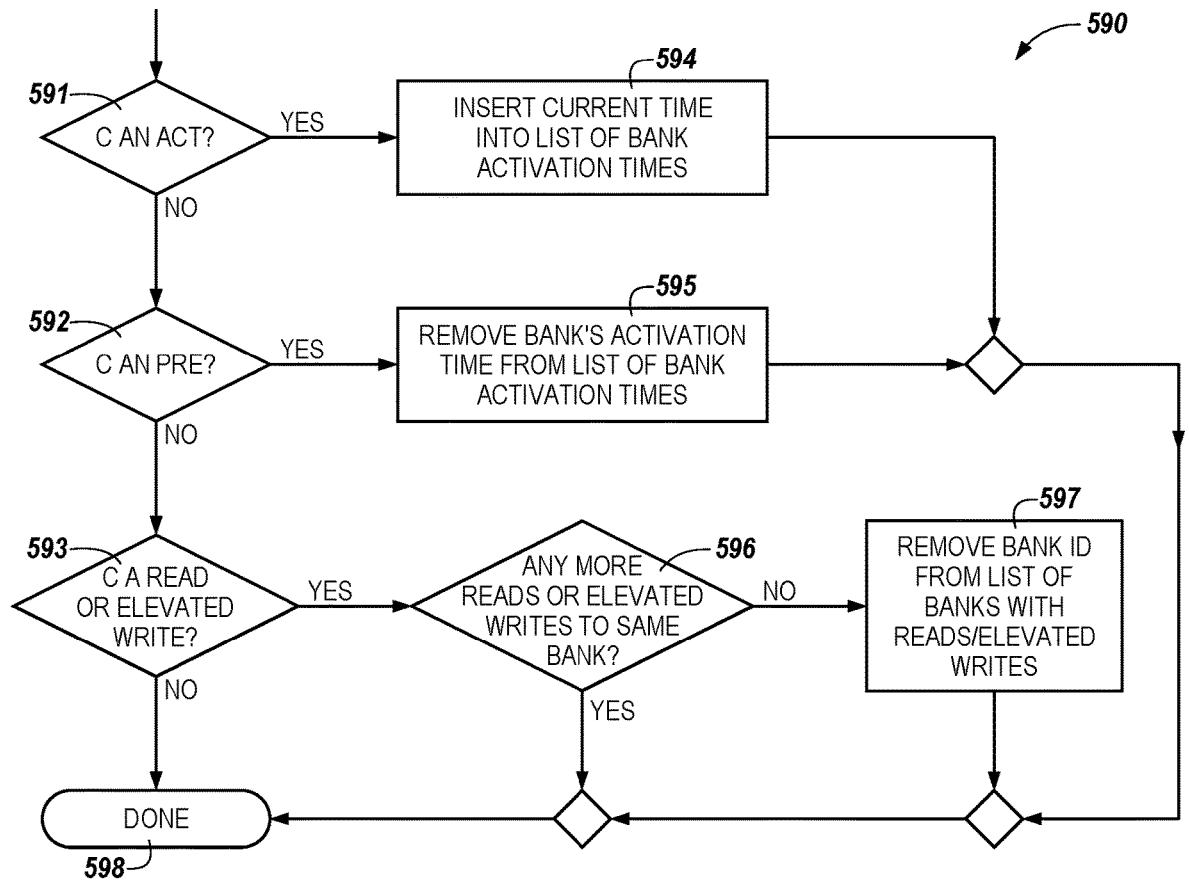

FIGS. 5A, 5B, and 5C illustrate a flow chart 560 associated with implementing a command selection policy in accordance with a number of embodiments of the present disclosure. FIGS. 5A and 5B illustrate an example of one iteration through outstanding commands (e.g., from oldest to newest) currently in a command queue (e.g., command queue 334) and selecting a particular one of the commands to issue (e.g., based on a FRFCFS policy with a strict read priority). FIGS. 5A and 5B are continuous through cutline 581. FIG. 5C illustrates actions that can be taken subsequent to selecting a command for issuance in accordance with a number of embodiments of the present disclosure.

As shown in FIG. 5A, the command selection iteration can begin, as shown at 562 (e.g., issue unit starts), with initiation (e.g., waking up) of the issue unit (e.g., 322). At 563 an index "i" is initialized (to "0"), and the flow shown in FIGS. 5A and 5B executes as each of i commands in the queue are evaluated. At 564 it is determined whether all of the commands in the command queue (e.g., command queue 334) have been evaluated for the particular iteration. Once all the commands have been evaluated, the condition 564 is met (e.g., i equals the quantity of commands in the queue) and one of the commands in the queue is selected for issuance according to a particular selection policy (e.g., as shown at 590). If there are commands in the queue remaining to be evaluated for a particular iteration (e.g., i does not equal the quantity of the commands in the queue), then flow moves to 566.

At 566, a determination is made as to whether command i (e.g., the "$i^{th}$" command) is not a read command, whether the $i^{th}$ command is not an elevated write command, and whether a bank ID corresponding to the $i^{th}$ command is in the list of banks with outstanding read commands and/or elevated write commands (e.g., a list maintained by bank unit 330).

If it is determined that the $i^{th}$ command is not a read command, the $i^{th}$ command is not an elevated write command, and the bank ID associated with the ith command is in the list of banks with outstanding read commands and/or elevated write commands, then a bank block is executed at 574 and command i is marked as not issuable as shown at 576. A bank block refers to the issue unit (e.g., 322) blocking particular commands from issuing to a particular bank even the commands may otherwise be issuable (e.g., ready to issue) according to a selection policy. As shown at 572, the index i is incremented (e.g., i=i+1) and the flow returns to 564.

Responsive to a determination that command i is a read command, command i is an elevated write command, or the bank ID associated with command i is not in the list of banks with outstanding read commands and/or elevated write commands, a determination regarding whether command i is a read command or whether command i is an elevated write command is made (e.g., at 568 and 570, respectively). If command i is a read command, the flow proceeds to 578 where it is determined whether the read command i has a read-after-write dependence. If the read command i has a read-after-write dependence, then the read command i is marked as not issuable at 576 and flow proceeds to 572 with an increment to index i.

If the read command i does not have a read-after-write dependence (as determined at 578), then flow continues to 582. At 582 it is determined whether a read command "R" exists that has a read-after-write dependence through the same bank as the bank to which the read command i is directed and where the R's row is open. If such a read exists, then at 576 the read command i is marked as not issuable (e.g., such that a pre-charge command corresponding to the read command i is blocked from issuing to the bank), such that read command R (and the writes on which it depends) can proceed prior to issuance of the pre-charge command corresponding to read command i. If such a read command R does not exist (e.g., as determined at 582), then flow proceeds to 584. At 584 a determination is made regarding whether time $t_{RCD}-t_{WTR}$ has passed since an activation of read command i's row (e.g., via an activation command ACT).

If time $t_{RCD}-t_{WTR}$ has not passed since activation of read command i's row, then flow proceeds with incrementing index i at 572. If time $t_{RCD}-t_{WTR}$ has passed since activation of read command i's row, then the channel is blocked at 586 and all commands in the queue other than read commands and elevated write commands are marked as not issuable at 588, and flow proceeds to 590. Executing the channel block at 586 prevents further commands to the channel from issuing until the read command i (or it's corresponding ACT and/or PRE command) has issued. As described above, prior to the passing of time $t_{RCD}-t_{WTR}$ since read command i's row being activated, write commands may continue being issued to other banks of the channel (e.g., even though writes to read command i's bank may be blocked).

Responsive to a determination (e.g., at 570) that command i is an elevated write command, a determination as to whether time $t_{RCD}-t_{CCD}$ has passed since an activation of write command i's row (e.g., via an ACT command). If time $t_{RCD}-t_{CCD}$ has expired, then the channel is blocked at 586 and all commands in the queue other than read commands and elevated write commands are marked as not issuable at 588, and flow proceeds to 590. If time $t_{RCD}-t_{CCD}$ has not passed since activation of write command i's row, then flow proceeds with incrementing index i at 572.

Responsive to iterating through the commands in the queue, as described above, the issue unit selects a command "C" for issuance (e.g., at 590). Command C can be selected from among column commands such as read commands and write commands, as well as row commands such as activation commands (ACT) and pre-charge commands (PRE) corresponding to reads and/or writes. As shown at 590, the command C can be selected in accordance with a FRFCFS read priority policy such as those described herein.

As shown at 591, a determination can be made as to whether selected command C is an activation command (ACT). As shown at 594, if the selected command C is an activation command, then the current time is added to a list of bank activation times (e.g., such as described above in association with time unit 322), and flow continues to 598 (e.g., with issuance of the activation command to the target bank).

As shown at 592, a determination can be made as to whether selected command C is a pre-charge command (PRE). As shown at 595, if the selected command C is a pre-charge command (PRE), then the activation time corresponding to command C's bank is removed from the list of bank activation times, and flow continues to 598 (e.g., with issuance of the pre-charge command to the target bank).

As shown at 593, a determination can be made as to whether selected command C is a read command or an elevated write command. As shown at 596, if the selected command C is a read or an elevated write, then a determination is made at 596 regarding whether the queue contains any other reads or elevated writes to command C's bank. If the queue contains more reads or elevated writes to the same bank as command C, then flow continues to 598 and selected command C (e.g., the read or elevated write) issues. If it is determined at 596 that the queue does not contain more reads or elevated writes to command C's bank, then flow continues to 597 and the bank ID corresponding to command C's bank is removed from the list of banks with reads and/or elevated writes (e.g., a list such as that described in association with bank unit 330) and the selected command C (e.g., the read or elevated write) issues at 598.

The examples show in FIGS. 2 to 5 are provided for memory devices using row and column based addressing such as DDR4, DDR5, and/or FeRAM devices. Although 3DXP devices do not fall into this class of devices, the embodiments can be modified to allow application to 3DXP devices.

While the devices that use row and column based addressing are composed of banks, where each bank can have one row active at a time, the 3DXP devices are composed of partitions, where partitions do not comprise row addressing nor row activation commands. While the DRAM devices and FeRAM devices have the timing parameter $t_{RCD}$ to specify a time required between sending a row command and sending a column command, as well as the timing parameter $t_{WTR}$ for specifying the minimum time between sending a write command and a read command, an 3DXP device does not have said timing parameters. Rather, 3DXP has timing parameters that specify the minimum time required between commands to the same partition and commands to different partitions.

The timing parameters can include $t_{WR2WR\_SAMEPART}$ to describe a time to perform two write operations to a same partition, $t_{WR2WR\_DIFFPART}$ to describe a time to perform two write operations to different partitions, $t_{RD2RD\_SAMEPART}$ to describe a time to perform two read operations to a same partition, $t_{RD2RD\_DIFFPART}$ to describe a time to perform two read operations to different partitions, $t_{WR2RD\_SAMEPART}$ to describe a time to perform a write operation and a read operation to a same partition, $t_{WR2RD\_DIFFPART}$ to describe a time to perform a write operation and a read operation to different partitions, $t_{RD2WR\_SAMEPART}$ to describe a time to perform a read operation and a write operation to a same partition, $t_{RD2WR\_DIFFPART}$ to describe a time to perform a read operation and a write operation to different partitions, and $t_{DQ\_TURN\_AROUND}$ to describe a time penalty for turning a bus around.

For a given permutation of two commands (e.g., two read commands, two write commands, a read command followed by a write command, and/or a write command followed by a read command), the time (e.g., minimum time) used to send those two commands to the same partition is greater than the time to send two commands to different partitions. Due to this, sending a non-elevated write command to a partition for which there is an outstanding read command and/or an elevated write command, can be avoided, as sending the non-elevated write command can incur delays in the issuance of the read commands and/or elevated write commands. The bank blocking examples used herein can be applied to 3DXP devices by blocking partitions in the same manner that banks are blocked.

However, blocking partitions can be different than blocking banks as applied to 3DXP devices given that the time parameter at which the channel block is applied is a function of row activation times and either $t_{RCD}$ and $t_{WTR}$ in the case of a channel block for a read command or $t_{RCD}$ and $t_{CCD}$ (in the case of a channel block for an elevated write). Given that 3DXP devices have neither row activations nor associated timing parameters, the examples described herein can be adapted to 3DXP devices. For example, the activation time unit 332 in FIG. 3 can, in lieu of tracking row activation times, track the times that the last read command and the last write command were sent to each partition. When a read command or an elevated write command is outstanding to a partition P, the command selection logic, the issue unit, and/or the controller can block non-elevated write commands to that partition. To determine the duration of time for which the controller can continue issuing non-elevated write commands to other partitions, the controller uses a time stamp at which the last read command and the last write command were sent to partition P. If the earliest time that the next read command can be sent to P is constrained by the last read sent to P, the controller can continue to issue non-elevated write commands to other partitions for $t_{RD2RD\_SAMEPART}-t_{WR2RD\_DIFFPART}$ after the previous read command to P was issued. If the earliest time that the next read command can be issued to P is constrained by the last write command sent to P, the controller can continue to issue non-elevated write commands to other partitions for $t_{WR2RD\_SAMEPART}-t_{WR2RD\_DIFFPART}$ after the previous write command to P was issued. When prioritizing an elevated write command, the timing parameters associated with a 3DXP device can be used. For example, if the earliest time that the next read command can be issued to P is constrained by an elevated write command sent to P, the controller can continue to issue elevated write commands to P for $t_{WR2WR\_SAMEPART}-t_{WR2WR\_DIFFPART}$ after the previous elevated write command to P was issued.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a timer unit configured to generate timestamps for activation commands provided to a memory device in association with implementing a command selection policy; and
   command selection logic configured to implement the command selection policy by:
   responsive to receiving a read command, blocking a first number of write commands to a bank;
   responsive to blocking the first number of write commands, issuing, to the memory device, an activation command associated with the read command, wherein the read command comprises an address of the bank and a channel of the memory device;
   responsive to issuing the activation command, blocking a second number of write commands to the channel after an expiration of a predetermined duration of time that is based on memory device timing parameters wherein the predetermined duration of time comprises a difference between a row-to-column delay and a write-to-read delay; and
responsive to blocking the second number of write commands, issuing the read command to the memory device.

2. The apparatus of claim 1, wherein the memory device timing parameters include the row-to-column delay, the write-to-read delay, and a column-to-column delay.

3. The apparatus of claim 1, wherein the predetermined duration of time is selected based on a read-after-write dependence associated with the read command.

4. The apparatus of claim 3, wherein the command selection logic is further configured to select the predetermined duration of time to include a difference between the row-to-column delay and a column-to-column delay based on a determination that the read-after-write dependence is associated with the read command.

5. An apparatus, comprising:
a command queue to receive a read command for a bank and a channel of a memory device;
a bank unit to provide bank addresses associated with outstanding read commands and elevated write commands from the memory commands;
bank state unit configured to indicate a state of banks corresponding to a memory device; and
command selection logic to:
determine whether there is a write command with a read-after-write dependence to the read command using the bank addresses;
block a first number of write commands to the bank using the bank state unit to indicate a blocking state for the bank;
issue an activation command associated with the read command;
block a second number of write commands to the channel using the bank state unit to indicate a blocking state for a plurality of banks in the channel; and
select the write command and the read command for issuance based on a first-ready, first-come, first-served (FRFCFS) policy in response to determining that the write command has the read-after-write dependence to the read command.

6. The apparatus of claim 5, further comprising a decoder to decode a bank address corresponding to the read command.

7. The apparatus of claim 6, wherein the command selection logic is further configured to determine whether there is the elevated write command with the read-after-write dependence to the read command by comparing the bank to the bank addresses to determine whether the read-after-write dependence exists.

8. The apparatus of claim 5, further comprising a decoder to decode a row address corresponding to the read command.

9. The apparatus of claim 8, the command selection logic is further configured to determine whether there is the elevated write command with the read-after-write dependence to the read command by comparing the row address to a plurality of row addresses provided by the bank unit to determine whether the read-after-write dependence exists.

10. A method, comprising:
decoding a bank address corresponding to a bank and a channel address corresponding to a channel of a memory device from a read command received at the memory device;
blocking a first number of write commands to the bank;
issuing an activation command associated with the read command;
blocking a second number of write commands to the channel;
selecting the read command, from a plurality of prioritized queues, for issuance based on a first-ready, first-come, first-served (FRFCFS) policy in which the read command is prioritized over the first number of write commands and the second number of write commands; and
selecting a write command for issuance only if the write command is associated with the read command having a read-after-write dependence.

11. The method of claim 10, wherein the plurality of prioritized queues includes a highest priority queue comprised of column read commands.

12. The method of claim 11, wherein the plurality of prioritized queues includes a second highest priority queue comprised of row read commands.

13. The method of claim 12, wherein the plurality of prioritized queues includes a third highest priority queue comprised of column write commands.

14. The method of claim 13, wherein the plurality of prioritized queues include a fourth highest prioritized queue comprised of row write commands.

15. The method of claim 14, further comprising selecting the read command by selecting the read command from one of the highest priority queue or the second highest priority queue.

16. The method of claim 10, further comprising selecting commands from the first number of write commands and the second number of write commands for issuance before the first number of write commands are blocked.

17. The method of claim 10, further comprising selecting commands from the second number of write commands for issuance before the second number of write commands are blocked.

18. The method of claim 10, further comprising selecting commands from a third number of write commands until the read command is selected for issuance.

19. A method, comprising:
decoding a bank address corresponding to a bank and a channel address corresponding to a channel of a memory device from a read command received at the memory device;
selecting commands from a first number of write commands and a second number of write commands for issuance before the first number of write commands are blocked;
blocking the first number of write commands to the bank;
issuing an activation command associated with the read command;
blocking the second number of write commands to the channel; and
selecting the read command, from a plurality of prioritized queues, for issuance based on a first-ready, first-come, first-served (FRFCFS) policy in which the read command is prioritized over the first number of write commands and the second number of write commands.

20. A method, comprising:
decoding a bank address corresponding to a bank and a channel address corresponding to a channel of a memory device from a read command received at the memory device;
blocking a first number of write commands to the bank;
issuing an activation command associated with the read command;

selecting commands from the second number of write commands for issuance before the second number of write commands are blocked;
blocking a second number of write commands to the channel; and
selecting the read command, from a plurality of prioritized queues, for issuance based on a first-ready, first-come, first-served (FRFCFS) policy in which the read command is prioritized over the first number of write commands and the second number of write commands.

21. A method, comprising:
decoding a bank address corresponding to a bank and a channel address corresponding to a channel of a memory device from a read command received at the memory device;
blocking a first number of write commands to the bank;
issuing an activation command associated with the read command;
blocking a second number of write commands to the channel;
selecting commands from a third number of write commands until the read command is selected for issuance; and
selecting the read command, from a plurality of prioritized queues, for issuance based on a first-ready, first-come, first-served (FRFCFS) policy in which the read command is prioritized over the first number of write commands and the second number of write commands.

\* \* \* \* \*